(12) United States Patent
Gan

(10) Patent No.: US 6,542,356 B2
(45) Date of Patent: Apr. 1, 2003

(54) COMPUTER ENCLOSURE INCORPORATING LATCH

(75) Inventor: Li Yuan Gan, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/906,538

(22) Filed: Jul. 16, 2001

(65) Prior Publication Data

US 2002/0167790 A1 Nov. 14, 2002

(30) Foreign Application Priority Data

May 8, 2001 (TW) .......................................... 090207487

(51) Int. Cl.[7] .................................................. G06F 1/16
(52) U.S. Cl. ....................... 361/683; 361/686; 361/724; 312/223.2
(58) Field of Search ................................ 361/679, 683, 361/686, 724–727; 312/223.1–223.3, 283, 285–287, 289, 290, 294, 319.1, 319.8, 321.5

(56) References Cited

U.S. PATENT DOCUMENTS

| | | | | |
|---|---|---|---|---|
| 5,004,866 A | * | 4/1991 | Cooke et al. ........... | 174/35 GC |
| 5,450,285 A | * | 9/1995 | Schlemmer ............... | 361/724 |
| 5,717,570 A | * | 2/1998 | Kikinis ................. | 361/685 |
| 5,896,273 A | * | 4/1999 | Varghese et al. ....... | 361/724 |
| 5,947,570 A | * | 9/1999 | Anderson et al. ...... | 312/223.2 |
| 5,967,633 A | * | 10/1999 | Jung .................... | 312/223.2 |
| 6,095,574 A | * | 8/2000 | Dean .................... | 292/164 |
| 6,356,436 B1 | * | 3/2002 | Buican et al. ......... | 361/683 |
| 6,373,697 B1 | * | 4/2002 | Lajara et al. ......... | 361/687 |

* cited by examiner

*Primary Examiner*—Darren Schuberg
*Assistant Examiner*—Yean Hsi Chang
(74) *Attorney, Agent, or Firm*—Wei Te Chung

(57) ABSTRACT

A computer enclosure includes a cage (100) defining nicks (142) on opposite sides thereof, a first door (200), a second door (300), and a latch (400). The first door includes a fixing board (210) having pegs (212) and hooks (213). The hooks engage with the nicks. The second door is similar to the first door. The latch includes a shaft (410) defining first notches (424) engagingly and releasably receiving the pegs of the first door, a body (430) defining second notches (444) engagingly and releasably receiving pegs of the second door, and a lock (460). When the lock is rotated from a locked position to a release position, the shaft and the body are moved inwardly to disengage from the pegs. The fixing boards are then moved downwardly to disengage the hooks away from the nicks, thereby disengaging the first and second doors from the cage.

20 Claims, 11 Drawing Sheets

ID is 6,542,356 B2

COMPUTER ENCLOSURE INCORPORATING LATCH

BACKGROUND OF THE INVENTION

1. Field of the Invention

The present invention relates to computer enclosures, and particularly to computer enclosures having latches to facilitate convenient assembly and disassembly.

2. Related Art

With current widespread use of personal computers, the demand for more and varied functions is unrelentingly high. It is thus frequently necessary to upgrade a mainframe of a computer, such as by way of expanding memory of the mainframe or adding electrical components to the mainframe. For conveniently adding or replacing electrical components, a computer enclosure needs to be able to be opened, closed, assembled or disassembled as quickly and conveniently as possible.

A conventional computer enclosure generally includes a chassis having a pair of openings at opposite sides thereof, and a pair of side panels covering the openings. A motherboard is fixed on one side panel. The side panel with the motherboard fixed thereon is disengagably attached on one side of the enclosure with screws. The other side panel is then fixed on the other side of the enclosure with screws.

Using screws to attach and detach a side panel is unduly complicated and time-consuming. Furthermore, a conventional computer enclosure does not have any protection from being disassembled by a mere layman. When a layman disassembles an enclosure, it is more likely that damage will be caused to the enclosure and especially to a motherboard within the enclosure.

SUMMARY OF THE INVENTION

Accordingly, an object of the present invention is to provide a computer enclosure which is readily assembled and disassembled.

Another object of the present invention is to provide a computer enclosure having a lock which prevents laymen from disassembling the enclosure.

To achieve the above-mentioned objects, a computer enclosure in accordance with the present invention comprises a cage with a top plate, a first door attached on one side of the cage, a second door attached on an opposite side of the cage, and a latch attached below the top plate. The top plate forms a pair of bent sections on opposite sides thereof. Each bent section defines a plurality of nicks. The first door comprises an outer panel, an inner board attached on an inner side of the outer panel, and a fixing board movably attached on the inner side of the outer panel. The fixing board forms a plurality of hooks engaging with the top plate in the nicks, and a pair of pegs extending into the cage. The structure of the second door is similar to that of the first door. The latch comprises a shaft defining a pair of first notches for receiving the pegs of the first door to prevent the fixing board from moving downwardly, a body defining a pair of second notches for receiving pegs of the second door to prevent a fixing board of the second door from moving downwardly, and a lock. When the lock is rotated from a locked position to a release position, the shaft and the body are moved inwardly to disengage from the pegs of the first and second doors. The fixing boards of the first and second doors are then moved downwardly to disengage the hooks away from the nicks, thereby disengaging the first and second doors from the cage.

Other objects, advantages and novel features of the present invention will be drawn from the following detailed embodiment of the present invention with attached drawings, in which:

DESCRIPTION OF THE PREFERRED EMBODIMENT

Figure 1:
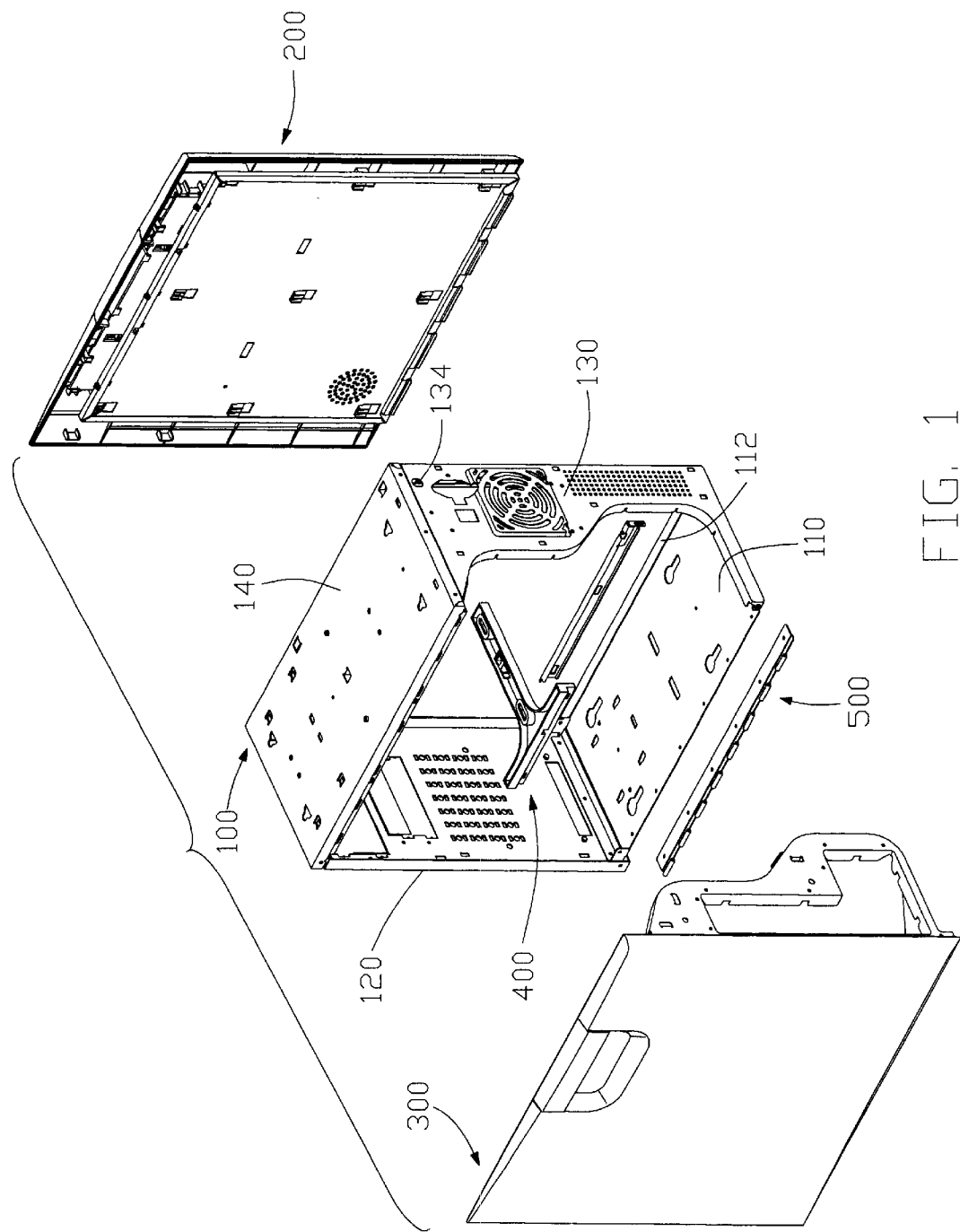
FIG. 1 is an exploded view of a computer enclosure in accordance with the present invention.

Referring to the attached drawings, FIG. 1 is an exploded view of a computer enclosure of the present invention. The computer enclosure comprises a cage 100, a first door 200, a second door 300, and a latch 400 attaching the first door 200 and the second door 300 to opposite sides of the cage 100.

The cage 100 comprises a bottom plate 110, a front plate 120, a rear plate 130, and a top plate 140. A flange 112 extends vertically upwardly from one side edge of the bottom plate 110. A keyhole 134 of a lock 460 (see FIG. 7) is disposed in a corner of the rear plate 130 near the top plate 140 and the first door 200.

Figure 2:
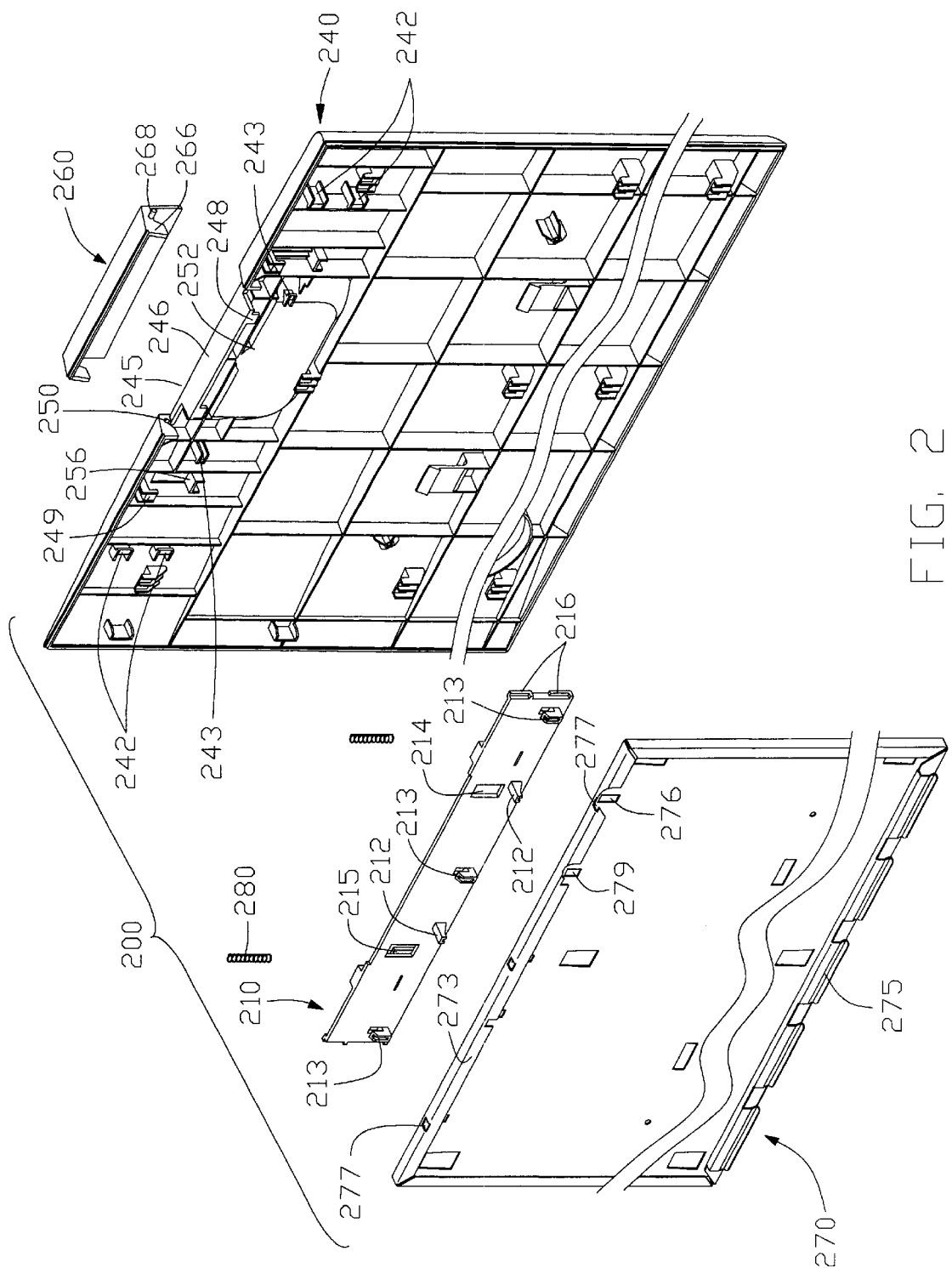
FIG. 2 is an exploded view of a first door of the enclosure of FIG. 1, with portions thereof abbreviated for convenience.
Figure 3:
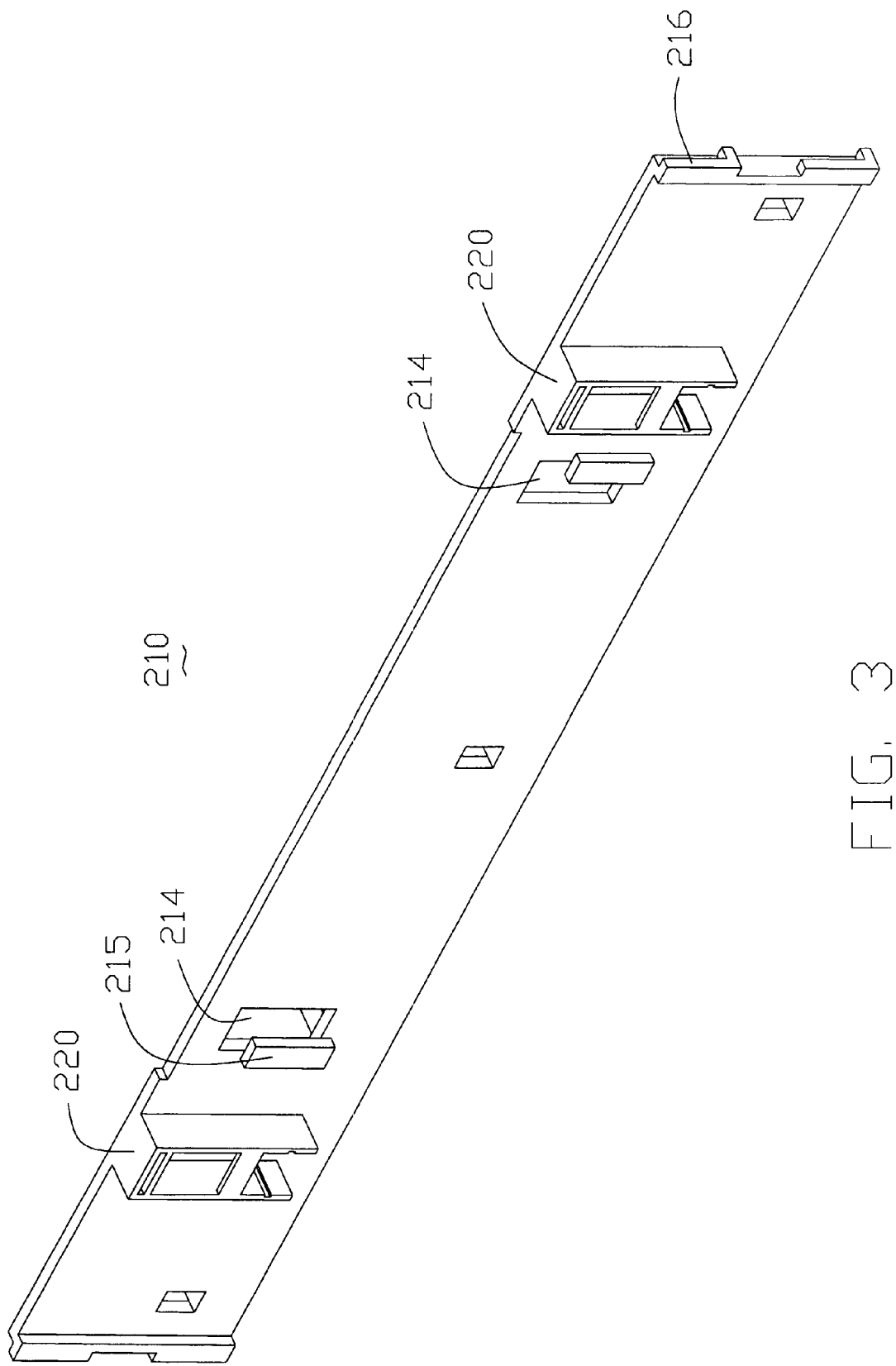
FIG. 3 is a perspective view of a fixing board of the first door of FIG. 2.

Referring also to FIGS. 2 and 3, the first door 200 comprises an outer panel 240, a handle 260, an inner board 270 attaching to an inner side of the outer panel 240, and a fixing board 210 attaching to one side of a top portion of the outer panel 240. A pair of pegs 212 and a plurality of engaging hooks 213 extend perpendicularly from one side of the fixing board 210. A pair of through openings 214 is defined in the fixing board 210. A pair of vertical tabs 215 extends from an opposite side of the fixing board 210, such that the vertical tabs 215 respectively oppose symmetrically opposite outmost parts of the through openings 214. A pair of first receiving portions 220 is formed on the said opposite side of the fixing board 210, for accommodating a pair of first springs 280 therein respectively. A pair of vertical bent strips 216 is respectively formed at opposite ends of the fixing board 210.

The outer panel 240 has a cutout 245 defined in a center portion of a top edge thereof. A horizontal tab 246 extends inwardly from an edge of the outer panel 240, at a bottom extremity of the cutout 240. A pair of protrusions 248 is bent downwardly from opposite ends of a free edge of the horizontal tab 246 respectively. A pair of pivot holes 250 is defined in the outer panel 240 at opposite sides of the cutout 245 respectively. A recess portion 252 is inwardly formed in the outer panel 240 below the cutout 245. Two pairs of first fasteners 242 are formed on an inner surface of the outer panel 240, on opposite sides of the cutout 245 respectively. Each pair of first fasteners 242 is vertically spaced. Each pair of first fasteners 242 is disposed generally between the recess portion 252 and a vertical outer edge of the outer panel 240, and corresponds to the bent strips 216 of the fixing board 210. A pair of second fasteners 243 is inwardly formed on opposite sides of the recess portion 252 respectively. The second fasteners 243 are between the opposite pairs of first fasteners 242, and correspond to the vertical tabs 215 of the fixing board 210. A pair of stop sections 256 is inwardly formed on opposite sides of the recess portion 252 respectively, corresponding to the first receiving portions 220 of the fixing board 210. A pair of press hooks 249 is inwardly formed on the outer panel 240, above the stop sections 256 respectively.

The handle 260 is generally L-shaped in profile. A pair of press portions 266 depends from opposite ends of the handle 260 respectively. A pair of first pivots 268 extends outwardly from the opposite ends of the handle 260, corresponding to the pivot holes 250 of the outer panel 240.

The inner board 270 comprises a bent plate 273 extending from a top edge thereof. The bent plate 273 is L-shaped in profile, whereby a portion thereof is disposed opposite and parallel to the inner board 270. A pair of apertures 279 is defined in the inner board 270 near an upper edge thereof, corresponding to the pegs 212 of the fixing board 210. A plurality of slots 276 is defined in the inner board 270 and a plurality of slits 277 is defined in the bent plate 273, the slots 276 and the slits 277 corresponding to the engaging hooks 213 of the fixing board 210. A plurality of catches 275 extends from a bottom edge of the inner board 243, for engaging with the flange 112 of the cage 100.

Figure 4:
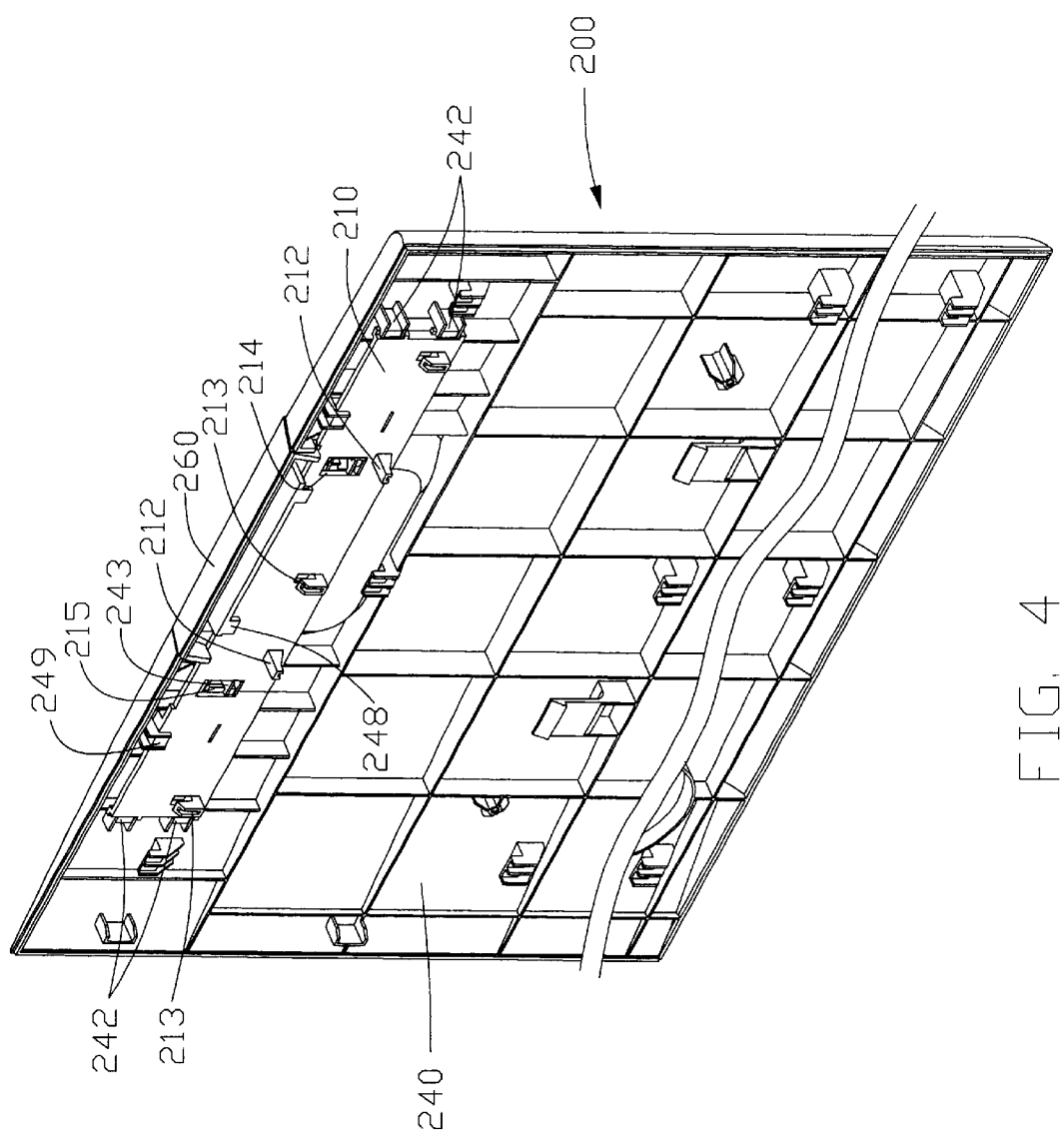
FIG. 4 is a view of an outer panel and the fixing board of the first door of FIG. 2 attached together.
Figure 5:
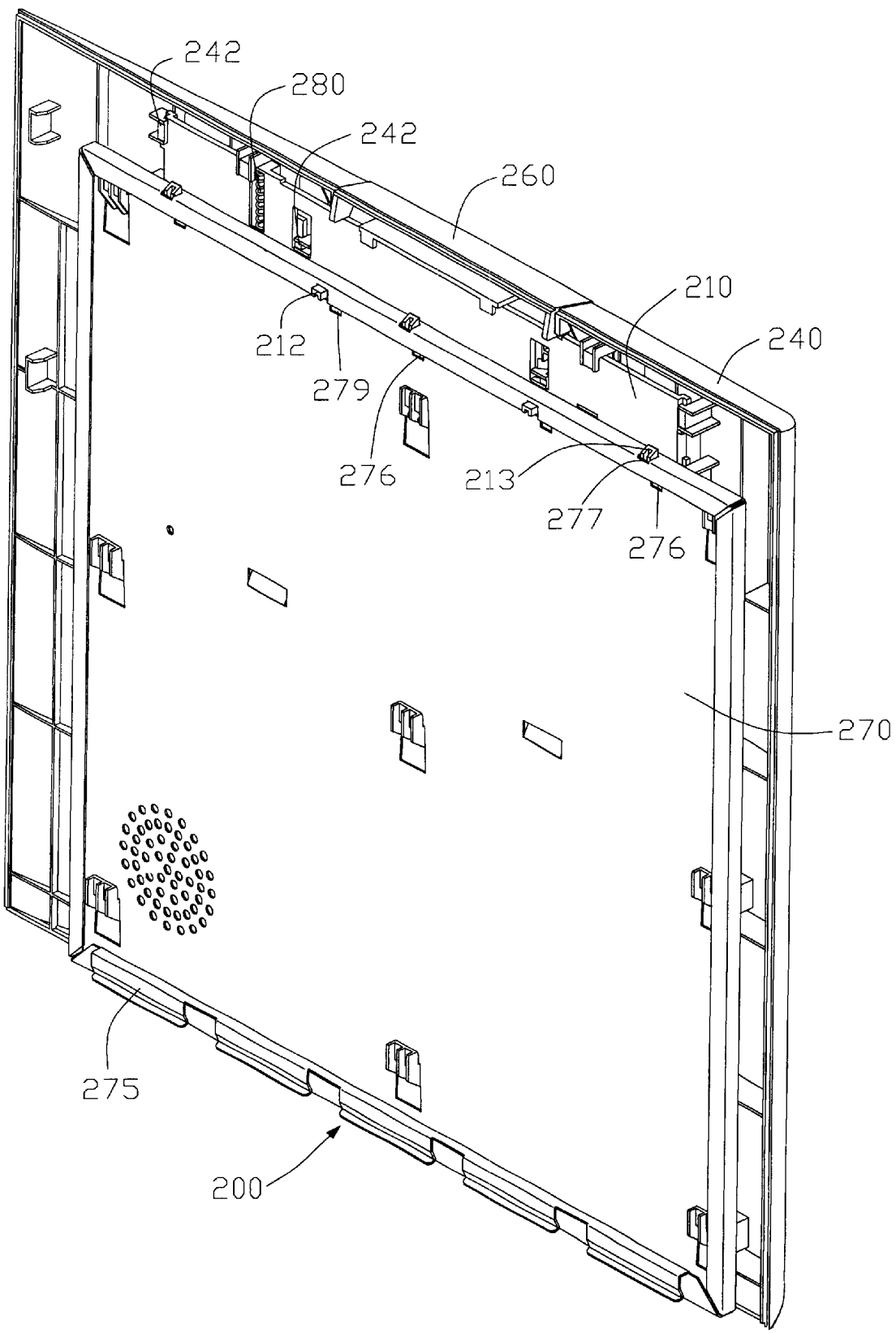
FIG. 5 is an assembled view of FIG. 2.

Referring also to FIGS. 4–5, in assembly of the first door 200, the first springs 280 are put inside the corresponding first receiving portions 220 of the fixing board 210. The fixing board 210 is then attached to the inner surface of the outer panel 240. The first fasteners 242 and second fasteners 243 respectively engage with the corresponding bent plates 216 and vertical tabs 215. Such engagements prevent the fixing board 210 from moving in longitudinal directions. The protrusions 248 and the press hooks 249 abut the said one side of the fixing board 210. A bottom end of each first spring 280 abuts the corresponding stop section 256 of the outer panel 240. The handle 260 is attached to the top portion of the outer panel 240. The first pivots 268 of the handle 260 are pivotably received in the corresponding pivot holes 250 of the outer panel 240. The press portions 266 of the handle 260 abut a top edge of the fixing board 210. The inner board 270 is then attached to the outer panel 240. The pegs 212 of the fixing board 210 are extended through the corresponding apertures 279 of the inner board 270, and can be moved vertically within the apertures 279. The engaging hooks 213 of the fixing board 210 are engaged with the inner board 270 in the slots 276 and slits 277 thereof. The engaging hooks 213 protrude above the fixing board 210, and can be moved vertically within the slots 276.

Figure 6:
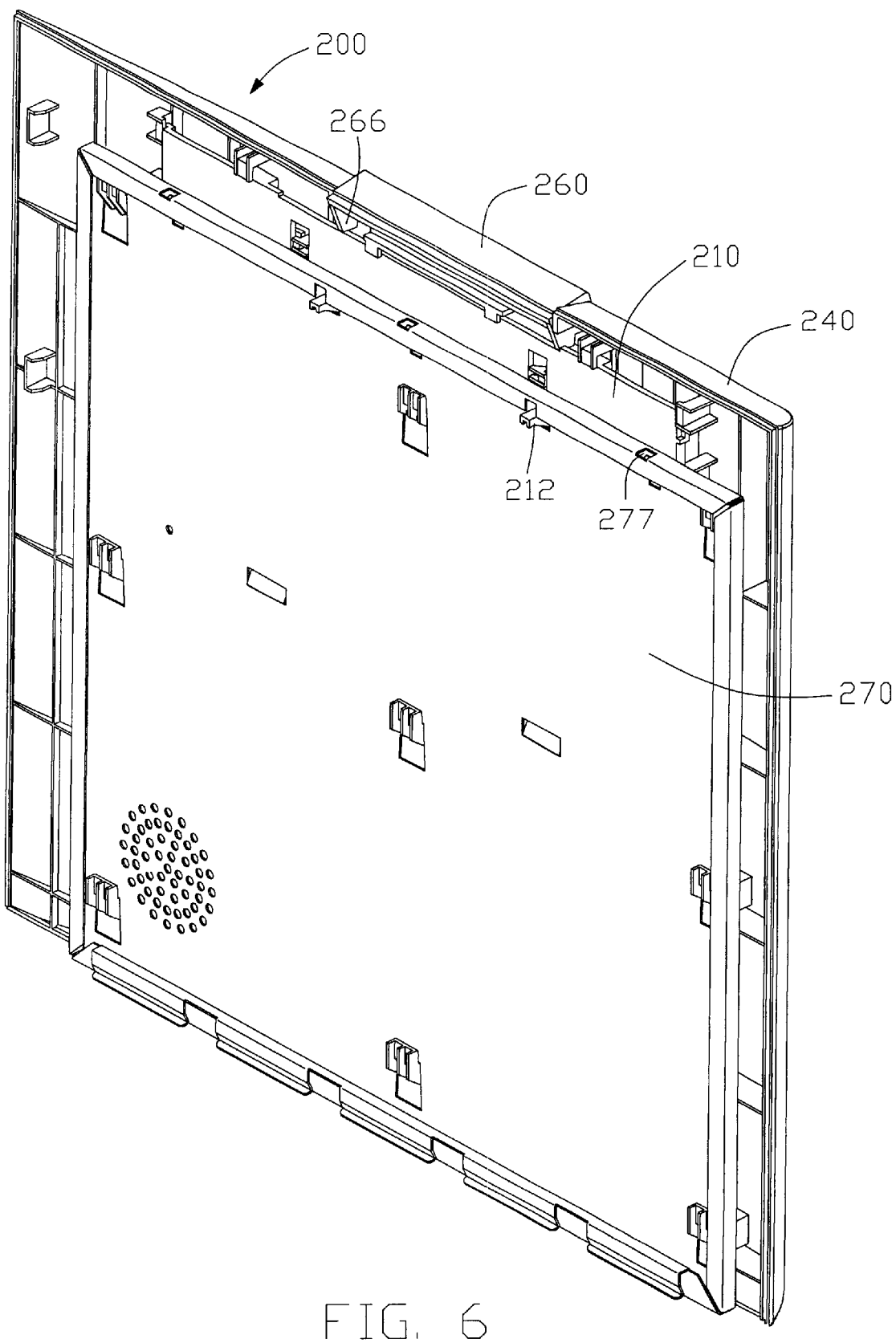
FIG. 6 is similar to FIG. 5, but showing a handle of the first door of FIG. 2 rotated so as to downwardly move the fixing board.

Referring also to FIG. 6, in operation of the first door 200, the handle 260 is pulled at a bottom edge thereof. This causes the press portions 266 of the handle 260 to rotate and downwardly push the fixing board 210. The engaging hooks 213 slide out of the slits 277 and into the slots 276. The first springs 280 within the first receiving portions 220 are compressed against the stop sections 256 of the outer panel 240. When the handle 260 is released, the first springs 280 resiliently return back to their original state and thereby upwardly push the fixing board 210 back to its original position. The fixing board 210 thereby pushes the handle 260 back to its original position.

The structure of the second door 300 is similar to that of the first door 200. The second door 300 is attached on one side of the cage 100 by means of a connecting bar 500.

Figure 7:
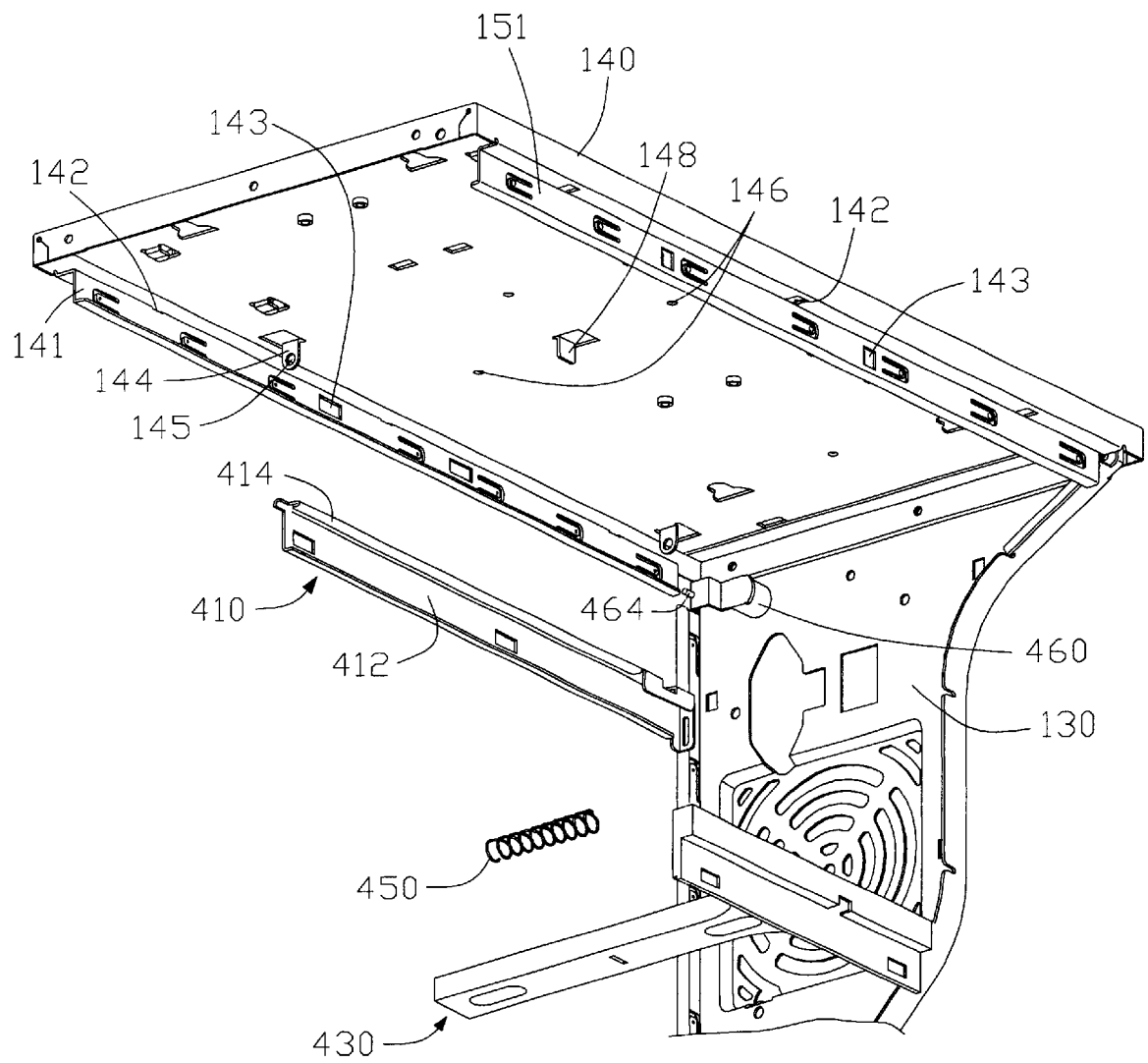
FIG. 7 is an exploded view of a latch of the enclosure of FIG. 1, together with part of a cage of the enclosure.
Figure 8:
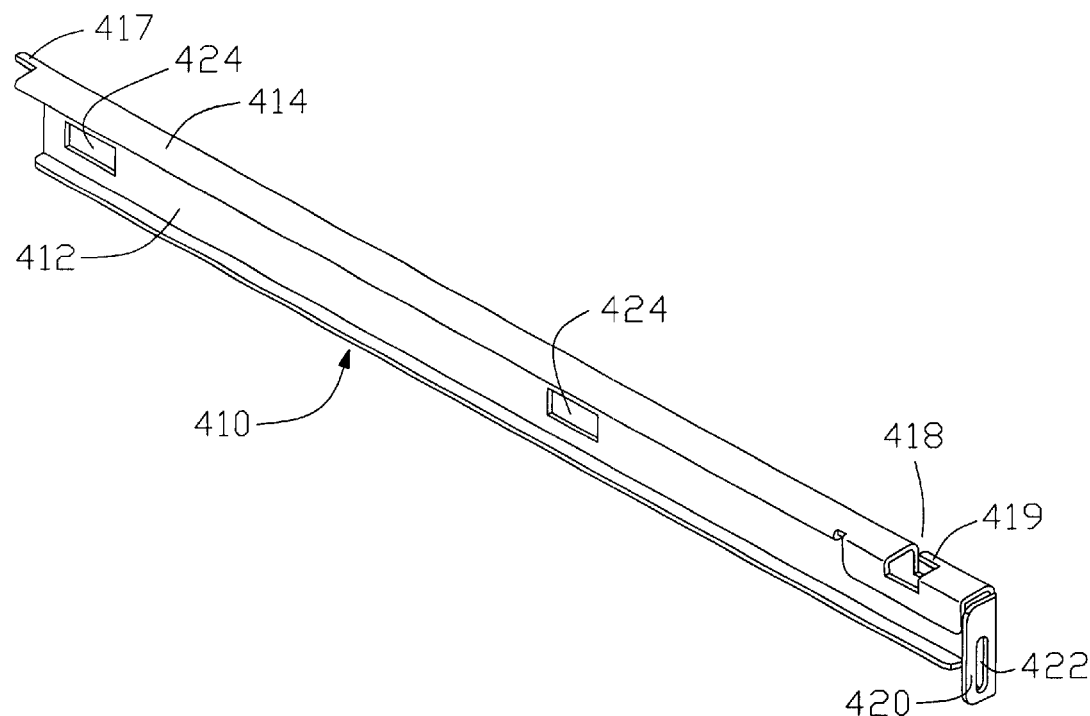
FIG. 8 is a perspective view of a shaft of the latch of FIG. 7.
Figure 9:
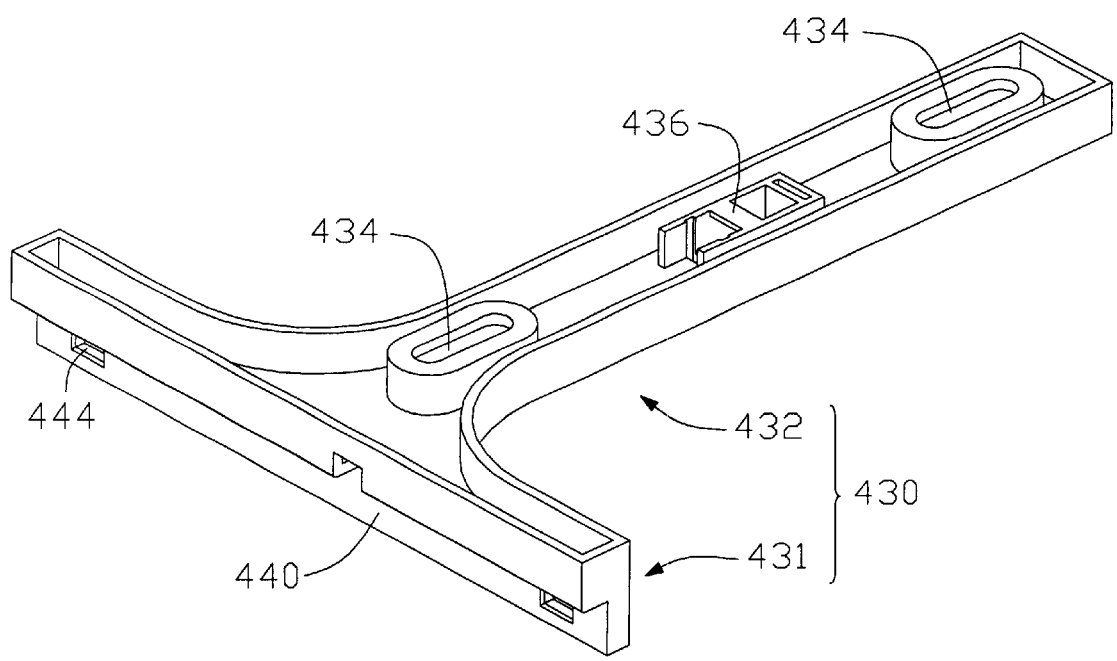
FIG. 9 is a perspective view of a body of the latch of FIG. 7.

Referring also to FIGS. 7–9, a pair of bent sections 141, 151 depends from opposite sides of the top plate 140 of the cage 100 respectively. The bent section 141 defines a plurality of nicks 142 corresponding to the engaging hooks 213 of the fixing board 210, and a pair of gaps 143 corresponding to the pegs 212 of the fixing board 210. The bent section 151 is similar in structure to the bent section 141. The bent section 151 also has a plurality of nicks 142 and a pair of gaps 143. A pair of vertical bent tabs 144 is downwardly stamped from the top plate 140. The bent tabs 144 are spaced far apart and are both near the first door 200. A pivot opening 145 is defined in each bent tab 144. A pair of screw holes 146 is defined in a middle portion of the top plate 140 of the cage 100. The screw holes 146 are spaced apart and disposed between the bent sections 141, 151. A stop tab 148 is downwardly stamped from the top plate 140 between the screw holes 146.

A lock 460 is attached to an inner surface of the rear plate 130 near the top plate 140 and the first door 200. The lock 460 has a second pivot 464 at an inmost portion thereof. The second pivot 464 extends inwardly away from and perpendicular to the rear plate 130.

The latch 400 comprises a shaft 410, a body 430, a second spring 450, and the lock 460. The shaft 410 is generally U-shaped in profile. The shaft 410 comprises an elongate horizontal upper panel 414, and an elongate side panel 412 depending from a longitudinal edge of the upper panel 414. A pair of spaced first notches 424 is defined in the side panel 412. One first notch 424 is disposed near one end of the side panel 412, and the other first notch 424 is disposed in a central portion of the side panel 412, such that the first notches 424 corresponding to the pegs 212 of the fixing board 210. An indentation 418 is defined through both the upper panel 414 and side panel 412 near an end of the shaft 410 which is opposite to the end at which one first notch 424 is disposed. A first post 417 extends coplanarly from one end of the upper panel 414 which is near one first notch 424. A second post 419 extends from an edge of the upper panel 414 adjacent the indentation 418. The second post 419 extends in the same direction as the first post 417, and into the indentation 418. A strap 420 extends perpendicularly from an end of the side panel 412 which is near the indentation 418. An upper edge of the strap 420 closely opposes an end edge of the upper panel 414. An orifice 422 is defined in the strap 420, for pivotably receiving the second pivot 464 of the lock 460.

The body 430 of the latch 400 is generally T-shaped, and comprises a fixing portion 431 and a pushing portion 432. A fixing plate 440 depends from an edge of the fixing portion 431 nearest the pushing portion 432. A pair of second notches 444 is defined in the fixing plate 440, corresponding to pegs (not shown) inwardly formed on the second door 300. A pair of elongate cavities 434 is defined in the pushing portion 432 near opposite ends thereof respectively, corresponding to the screw holes 146 of the top plate 140. A second receiving portion 436 is formed in the pushing portion 432 between the cavities 434.

Figure 10:
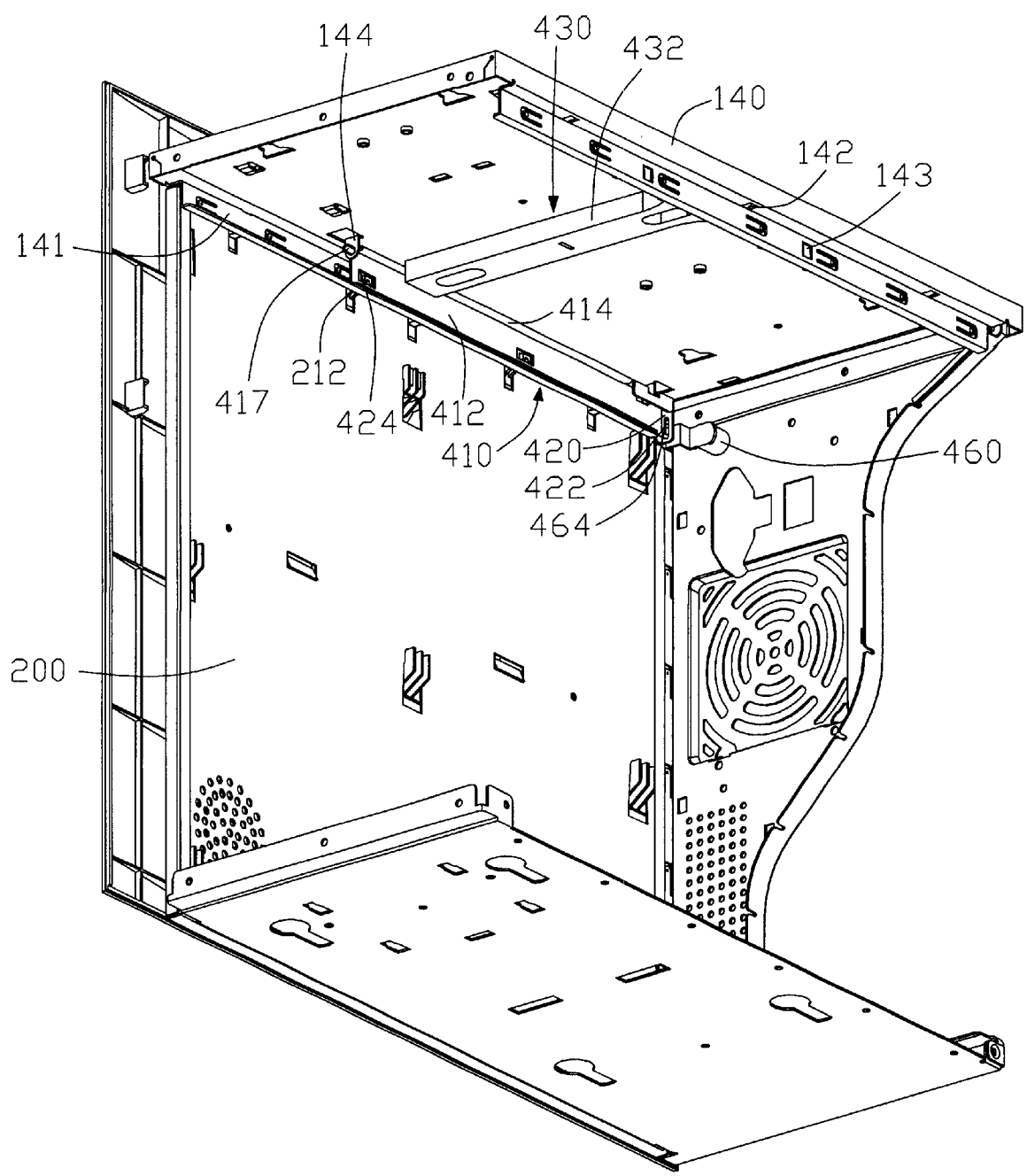
FIG. 10 is an assembled view of the first door, the latch and part of the cage of the enclosure of FIG. 1, showing parts of the enclosure in a locked position.
Figure 11:
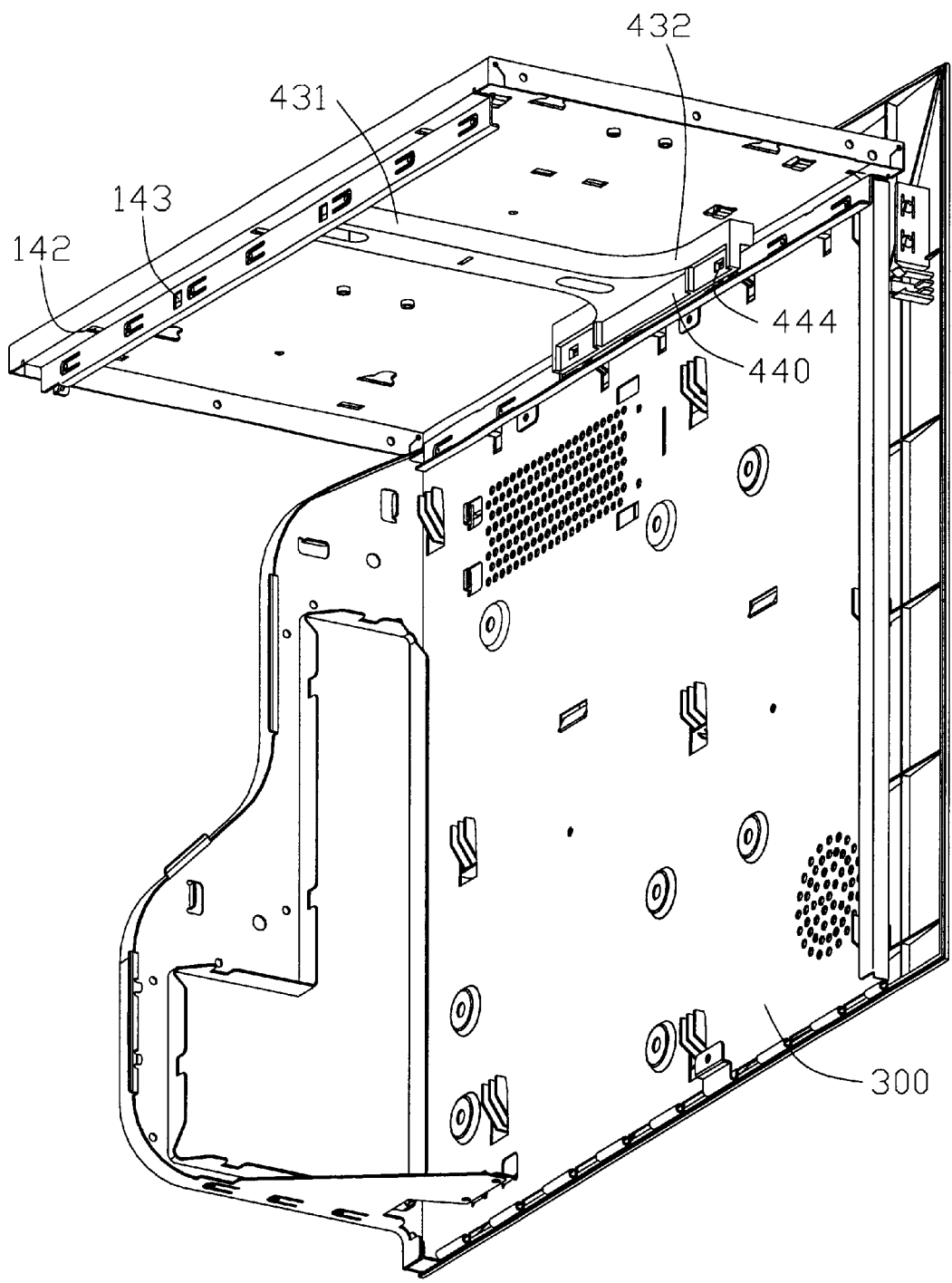
FIG. 11 is an assembled view of a second door, the latch and part of the cage of the enclosure of FIG. 1.

Referring also to FIGS. 10 and 11, the latch 400 is shown to fix the first door 200 and second door 300 to the cage 100. The shaft 410 is attached below the top plate 140. The first and second posts 417, 419 of the latch 400 are pivotably received in the corresponding pivot openings 145 of the bent tabs 144 of top plate 140. The second pivot 464 of the lock 460 is received in the orifice 422 of the shaft 410. The second spring 450 is then put into the second receiving portion 436 of the body 430. The body 430 with the second spring 450 accommodated therein is movably attached below the top plate 140, with a pair of screws (not shown) being respectively extended through the cavities 434 of the body 430 to be engagingly received in the screw holes 146 of the top plate 140. The stop tab 148 of the top plate 140 abuts one end of the second spring 450. A free end of the pushing portion 432 of the body 430 abuts the upper panel 414 of the shaft 410. The fixing plate 440 of the body 430 abuts the bent section 151 of the top plate 140.

The first door 200 is then attached to one side of the cage 100. The catches 275 of the inner board 270 of the first door 200 engage with the flange 112 of the bottom plate 110 of the cage 100 (see FIG. 1). The engaging hooks 213 of the fixing board 210 of the first door 200 engage with the bent section 141 of the top plate 140 in the nicks 142. The pegs 212 of the fixing board 210 of the first door 200 extend through the gaps 143 of the bent section 141 and into the cage 100. The pegs 212 can be moved vertically within the gaps 143.

The second door 300 is then attached to the bottom plate 110 at an opposite side of the cage 100, by connecting the connecting bar 500 thereto. Hooks (not labeled) of the second door 300 engage with the bent section 151 in the nicks 142. Pegs (not labeled) of the second door 300 extend through the gaps 143 of the bent section 151 and into the cage 100. The pegs can be moved vertically within the gaps 143.

The lock 460 is then rotated from a release position to a locked position, thereby rotating the shaft 410 of the latch 400 to a locked position. The pegs 212 of the first door 200 are received in the first notches 424 of the shaft 410. At this position, the fixing board 210 cannot be moved downwardly. Thus the engaging hooks 213 of the fixing board 210 cannot disengage from within the nicks 142 of the bent section 141 of the cage 100. The first door 200 is thus securely attached to the cage 100. Simultaneously, an inmost longitudinal edge of the upper panel 414 of the shaft 410 of the latch 400 abuts and pushes against a free end of the latch 400, such that the body 430 is pushed toward the second door 300. The second spring 450 is thereby compressed. The pegs of the second door 300 are received in the second notches 444 of the body 430. The second door 300 is thus securely attached to the top plate 140 of the cage 100.

Figure 12:
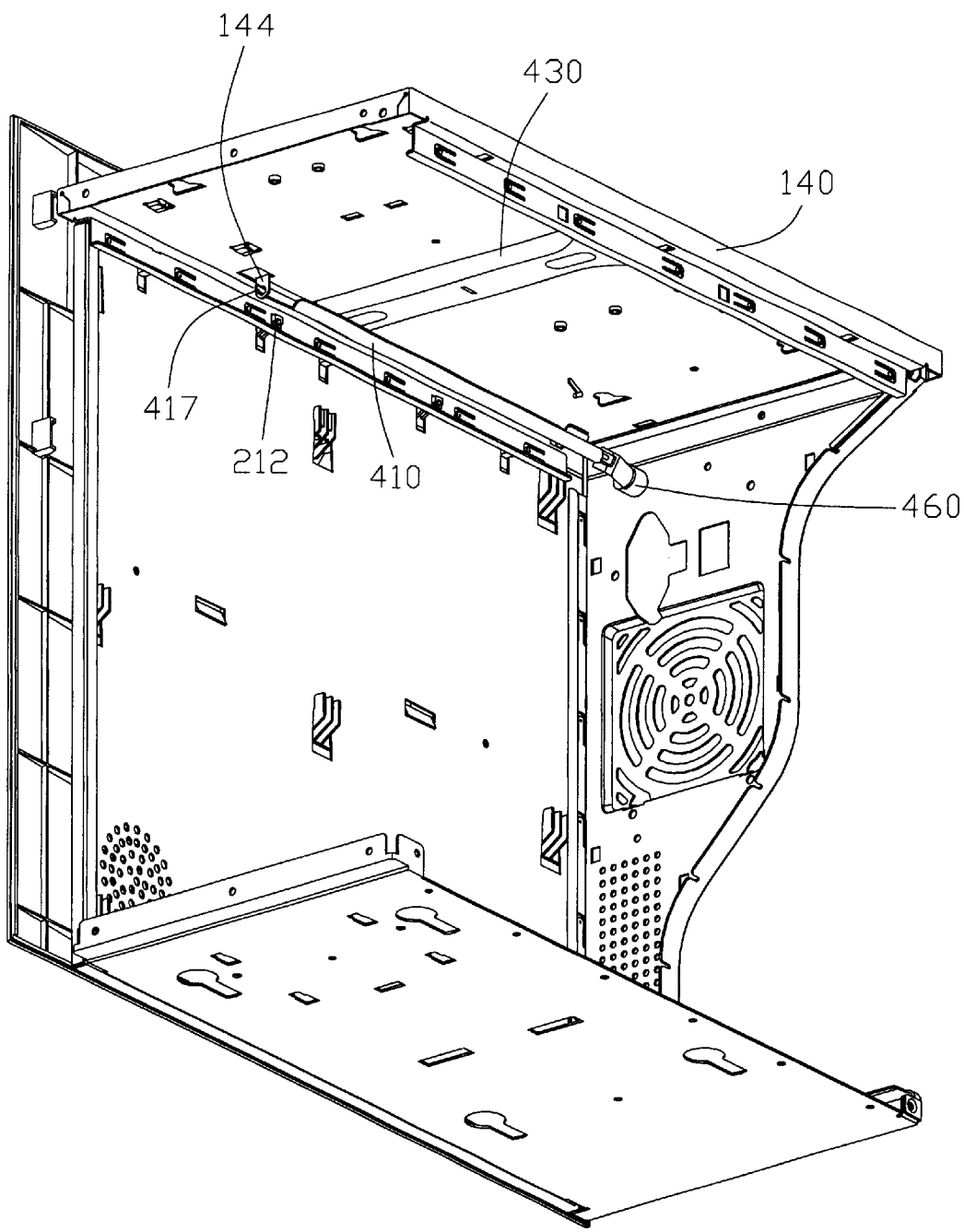
FIG. 12 is similar to FIG. 10, but showing parts of the enclosure in a release position.

Referring also to FIG. 12, in disassembly, the lock 460 is rotated from the locked position to the release position. The shaft 410 is thereby rotated to a release position by the second pivot 464 of the lock 460. The pegs 212 of the first door 200 are disengaged away from the first notches 424 of the shaft 410. The upper panel 414 of the shaft 410 is moved away from the free end of the pushing portion 432 of the body 430 of the latch 400. The second spring 450 expands partly back to its original state, and thereby pushes the body 430 away from the second door 300. The pegs (not shown) of the second door 300 are disengaged away from the second notches 444 of the body 430. The handle 260 of the first door 200 is then pulled outwardly at the bottom edge thereof. The fixing board 210 is thereby moved downwardly, causing the engaging hooks 213 thereof to disengage away from the nicks 142 of the cage 100. The first door 200 is thus disengaged from the cage 100. In the same way, the second door 300 is disengaged from the cage 100.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:
    a cage with a top plate, the top plate defining a plurality of nicks in opposite sides thereof;
    a first door attached on one side of the cage, the first door comprising a fixing board reciprocatably attached thereon, the fixing board having a plurality of engaging hooks engaging with the top plate in the nicks, the fixing board further having at least one peg extending into the cage;
    a second door attached on an opposite side of the cage, the second door being similar to the first door and also comprising a fixing board reciprocatably attached thereon, the fixing board having a plurality of engaging hooks engaging with the top plate in the nicks, the fixing board further having at least one peg extending into the cage; and
    a latch attached below the top plate, the latch comprising a shaft, a body and a lock rotatably mounted on the cage, the shaft defining at least one first notch engagably receiving the at least one peg of the first door, the body defining at least one second notch engagably receiving the at least one peg of the second door;
    wherein when the lock is rotated from a locked position to a release position, the shaft and the body are moved from a locked position to a release position to allow the at least one first and second notches to disengage from the pegs of the first and second doors, whereby the fixing boards of the first and second doors can be moved to disengage the hooks away from the nicks and thereby disengage the first and second doors from the cage.

2. The computer enclosure as claimed in claim 1, wherein the first door further comprises an outer panel and an inner board attached on an inner side of the outer panel, the fixing board of the first door being attached on a top portion of the inner side of the outer panel.

3. The computer enclosure as claimed in claim 2, wherein the fixing board of the first door has at least one receiving section accommodating at least one first spring therein, and the outer panel has at least one stop section abutting one end of the at least one first spring thereby allowing the fixing board of the first door to reciprocate.

4. The computer enclosure as claimed in claim 3, wherein a handle is pivotably attached on the outer panel, and wherein when the handle is pushed the fixing board of the first door is moved downwardly, and when the handle is released the fixing board of the first door is moved back to its original position by the at least one first spring.

5. The computer enclosure as claimed in claim 2, wherein the fixing board of the first door has bent strips on opposite sides thereof, and the outer panel has first fasteners engaging with the bent strips.

6. The computer enclosure as claimed in claim 5, wherein the fixing board of the first door defines at least one through opening, at least one vertical tab is attached on the fixing board of the first door and covers part of the at least one opening, and the outer panel has at least one second fastener engaging with the at least one vertical tab to thereby prevent the fixing board of the first door from moving in longitudinal directions.

7. The computer enclosure as claimed in claim 2, wherein the inner board defines a plurality of slits for extension of the hooks therethrough, and at least one aperture for extension of the at least one peg therethrough.

8. The computer enclosure as claimed in claim 1, wherein the shaft defines an orifice, and the lock has a pivot pivotably received in the orifice.

9. The computer enclosure as claimed in claim 1, wherein the top plate forms a pair of bent tabs, each bent tab defines a pivot opening therein, and the shaft of the latch has a pair of posts respectively pivotably received in the pivot openings.

10. The computer enclosure as claimed in claim 1, wherein the body of the latch is generally T-shaped.

11. The computer enclosure as claimed in claim 10, wherein the body comprises a fixing portion and a pushing portion, and wherein the at least one second notch is defined in the fixing portion.

12. The computer enclosure as claimed in claim 11, wherein the pushing portion has a second receiving section accommodating a second spring therein, and the top plate of the cage forms a stop tab abutting one end of the second spring.

13. The computer enclosure as claimed in claim 11, wherein the top plate of the cage defines a pair of screw holes, and the pushing portion defines a pair of cavities for extension of screws therethrough to engage in the screw holes.

14. The computer enclosure as claimed in claim 1, wherein the top plate of the cage has a pair of bent sections each defining at least one gap, and wherein the nicks of the cage are defined in the bent sections and the at least one peg of the first door and the at least one peg of the second door extend through the at least one gap of a corresponding bent section respectively to be vertically movable within the at least one gap of the corresponding bent section respectively.

15. The computer enclosure as claimed in claim 1, wherein the shaft has a strap defining an orifice therein, and the lock has a pivot extending through the orifice.

16. A computer enclosure comprising:
a cage with a top plate, a pair of bent sections depending from opposite sides of the top plate, each bent section defining a plurality of nicks;
a first door attached on one side of the cage, the first door comprising a handle and a fixing board attached on an inner side of the first door, the fixing board being vertically reciprocatable and having at least one peg extending into the cage and a plurality of hooks engagingly received in the nicks;
a second door attached on an opposite side of the cage, the second door being similar to the first door and also comprising a handle and a fixing board attached on an inner side of the second door, the fixing board being vertically reciprocatable and having at least one peg extending into the cage and a plurality of hooks engagingly received in the nicks; and
a latch attached below the top plate, the latch comprising a shaft and a fixing plate, the shaft defining at least one first notch engaging with the at least one peg of the first door to prevent the fixing board of the first door from moving downwardly thereby fixing the first door to the cage, the fixing plate defining at least one second notch engaging with the at least one peg of the second door to prevent the fixing board of the second door from moving downwardly thereby fixing the second door to the cage, a lock being connected with the shaft;
wherein when the lock is rotated from a locked position to a release position, the shaft and the fixing plate of the latch move inwardly to thereby cause all first and second notches to disengage from all pegs of the first and second doors, whereupon the first and second doors can be opened by actuating the handles to cause all fixing boards to move downwardly and thereby disengage all hooks out from the nicks.

17. The computer enclosure as claimed in claim 16, wherein the top plate forms a pair of bent tabs adjacent to one bent section of the top plate, and wherein the shaft is pivotably attached between the pair of bent tabs.

18. The computer enclosure as claimed in claim 17, wherein the latch further comprises a body attached between an opposite bent section of the top plate and the shaft.

19. The computer enclosure as claimed in claim 18, wherein the body comprises a pushing portion and a fixing portion on which the fixing plate is formed, the fixing portion abuts an inner side of the said opposite bent section, the pushing portion is attached below the top plate, the pushing portion is reciprocatable along longitudinal directions of the pushing portion, and a free end of the pushing portion abuts the shaft.

20. The computer enclosure as claimed in claim 19, wherein the pushing portion has a receiving section accommodating a spring, and the top plate forms a stop tab abutting one end of the spring to allow the body of the latch to reciprocatably move along longitudinal directions of the pushing portion.

* * * * *